May 30, 1939.  C. SPAETH  2,160,685
FLOAT GAUGE COVER
Filed Aug. 21, 1937  2 Sheets-Sheet 2
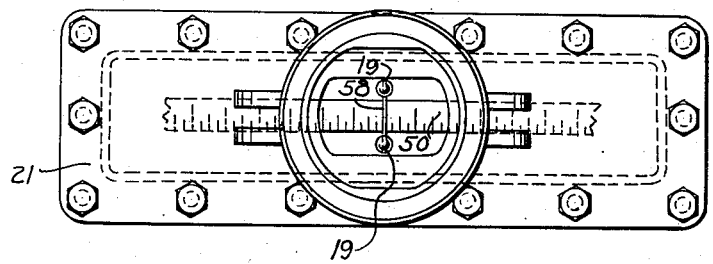
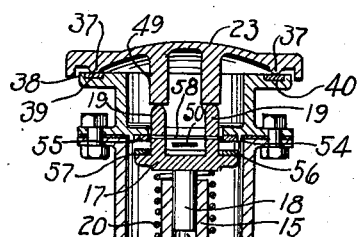
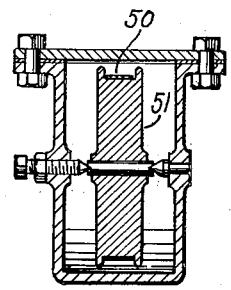
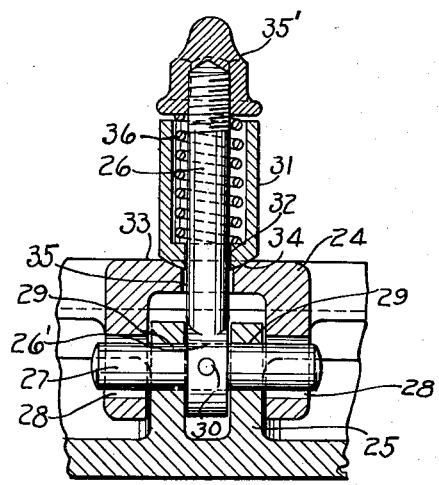
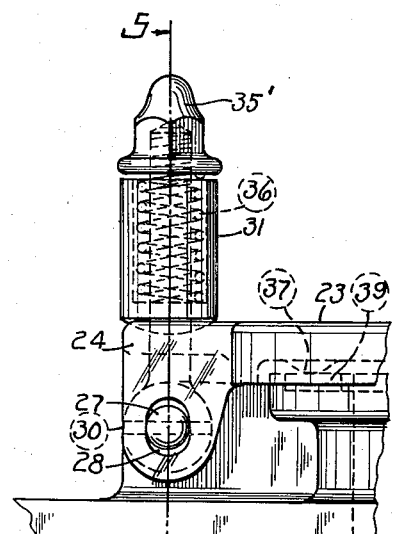
INVENTOR
BY Charles Spaeth
Fisher, Moses & Moore
ATTORNEYS Patented May 30, 1939

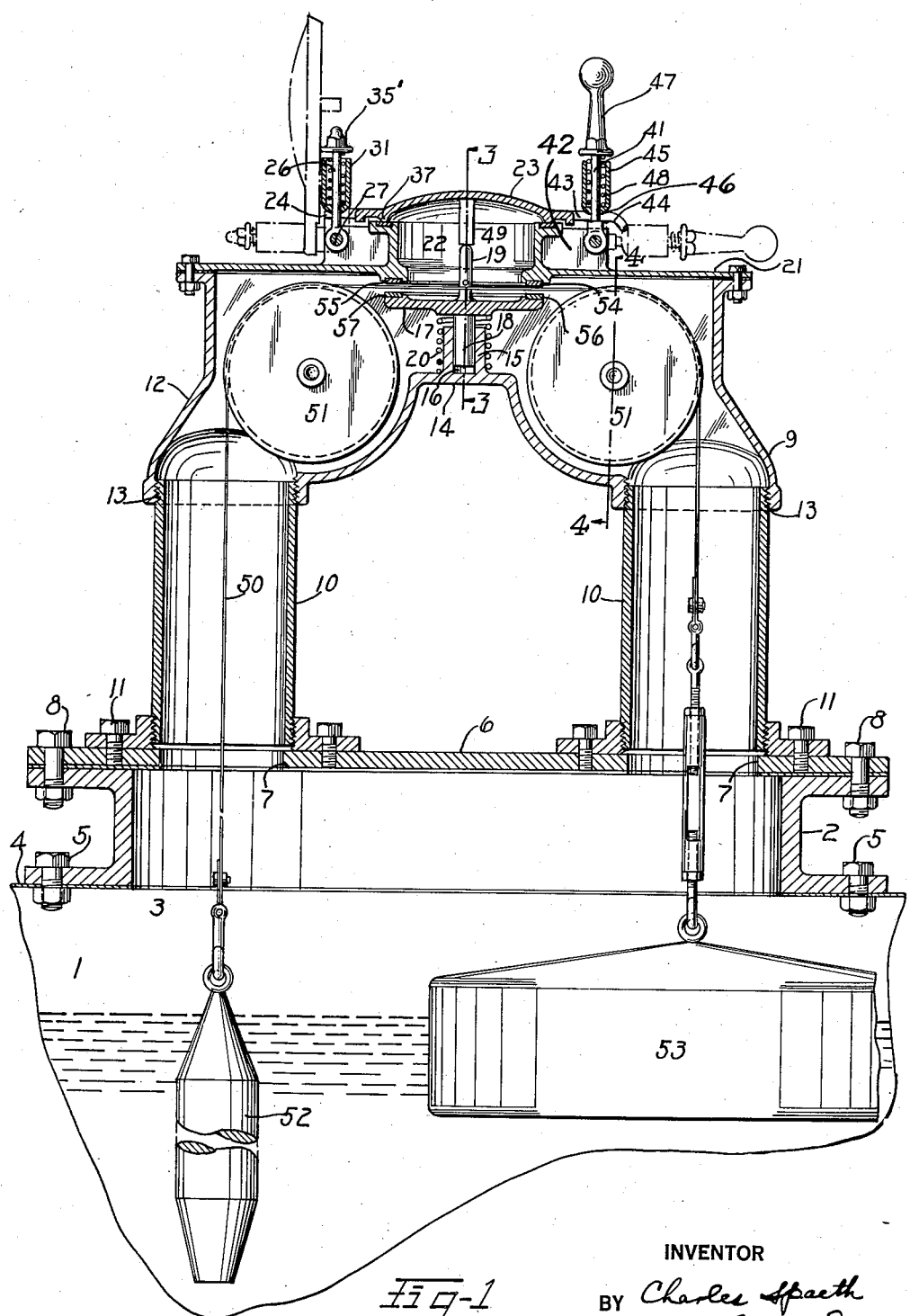

2,160,685

UNITED STATES PATENT OFFICE 2,160,685

FLOAT GAUGE COVER

Charles Spaeth, Cleveland, Ohio

Application August 21, 1937, Serial No. 160,265

6 Claims. (Cl. 73—306)

My invention relates to improvements in lids and covers used in connection with float gauges for automatically indicating the height of liquid in a storage tank and the like.

Heretofore it has been the practice in using gauges where readings are taken through a sight opening in the wall of a tank under pressure, to provide wipers for removing foreign materials, such as carbons deposited from vapors discharged from the gasoline, from the exposed surfaces of the indicator tape. However, it has been found that wipers become saturated with these carbons thus making it necessary to open the cover of the sight opening in order to clear the indicator tape, which results in a deleterious escape of gasoline vapors, thereby rendering the vapor control system ineffective.

The principal object of the present invention is to provide a lid or cover for the gauge housing whereby access may be had to the gauge tape for cleaning purposes and the like, and the provision of means on said cover for sealing the opening to prevent the escape of vapors.

Another object is the provision of a simply constructed and inexpensive cover arrangement for tank gauges which will effectively seal the gauge housing opening when a reading of the gauge tape is being taken or the tape is being cleaned.

Other objects and advantages will be apparent as the specification is considered in connection with the accompanying drawings, in which:

Figure 1 is a sectional view taken through a portion of a tank and the gauge head and cover;

Figure 2 is a plan view of the top with the cover removed;

Figure 3 is a section through the line 3—3 of Figure 1;

Figure 4 is a section through the pulley along the line 4—4 of Figure 1;

Figure 5 is an enlarged section through the hinge along line 5—5 of Figure 6; and Figure 6 is an enlarged side elevation of the hinge.

Referring more particularly to the drawings wherein like reference characters refer to like parts throughout the several views, numeral 1 designates a storage tank for gasoline and the like from which the liquid is drawn from time to time in a well known manner, not shown. An upstanding flange or collar 2 is positioned over an opening 3 in the top 4 of the tank and is secured thereto by bolts or the like 5. A substantially rectangular base plate 6, having two circular openings 7 therein, is mounted on the upper end of collar 2 by bolts or the like 8, and an upstanding gauge housing or casing 9, provided with two cylindrical tubes or pipes 10, is mounted on base plate 6 and secured thereto by bolts 11, whereby the tubes are positioned over and coincide with openings 7 in the base plate. The gauge housing 9 is comprised of a hollow substantially inverted U-shaped casing 12 connected to the upper ends of the cylindrical tubes by annular threaded portions 13. The intermediate underside of the casing 12 is flattened, as at 14, which portion is provided with an integrally formed, relatively short collar projection 15 having a recess 16 therein. A relatively flat pressure plate 17 is provided with a relatively short downwardly depending stud or stem 18 adapted to be slidably received within the recess 16 of projection 15, and an upstanding U-shaped or forked projection 19 is integrally formed on the upper face of the plate, substantially in alignment with stem 18. A suitable spring 20 encircling the collar 15 and engaging the under side of the plate serves to press or force the latter upwardly for a purpose hereinafter described. The top of the housing is enclosed by a relatively flat, substantially rectangular cover plate 21 having a centrally located walled opening 22 therein into which projection 19 extends.

A cap or lid 23 is hingedly connected to the cover plate 21 by means of a downwardly depending integral forked lug 24 formed on the edge of the lid, which lug sleeves over an upstanding forked lug 25 integrally formed on the cover plate adjacent walled opening 22 therein. The hinge assembly hereinafter described is more clearly illustrated in Figures 5 and 6 of the drawings. An upstanding hinge pin 26 having its lower end apertured as at 26' is fitted between the forks of lug 25 and held in position therebetween by a straight pin 27 which extends through slightly elongated or oblong openings 28 in the cover lug 24, openings 29 in plate lug 25 and the opening 26' in the lower end of the hinge pin. A relatively small pin 30 extending through the hinge pin serves to retain the latter in position on the straight pin 27. A hollow cup-shaped socket 31, having an opening 32 in the lower end thereof, is sleeved over hinge pin 26 and the underside of the socket is bevelled as at 33, whereby the same fits within a bevelled seat 34 on the upper end of a vertical opening or bore 35 extending through cap lug 24. A tension spring 36 is positioned within the socket and the upper end of hinge pin 26 is threadedly connected to a stop nut 35' whereby the upper end of the spring engages the underside of the nut for a purpose presently described.

The underside of the cap 23 is provided with an integral downwardly depending sealing ring 37, adjacent the periphery thereof which is adapted to seat against a packing ring or gasket 39, of suitable material positioned within a recess 40 in a flange 38, on the upper end of the walled plate opening 22, whereby a tight seal for the cap is effected. A latch pin assembly 41, of similar design and construction as the heretofore described hinge pin assembly 26, is hingedly mounted on an upstanding integral forked cover plate lug 42. A forked or pronged catch 43 extends laterally from the periphery of the cover and the outer ends thereof are slightly curved or bent downwardly as at 44. Thus the latch pin 41 extends upwardly between the prongs or forks 43 and the bevelled end 46 of a hollow socket 45 is adapted to seat upon the upper face of the prongs, as seen in Figure 1 of the drawings. An enlarged knobbed handle or grip 47 is suitably mounted on the upper end of the pin 41 and a spring 48, positioned within the socket and encircling the pin, is adapted to engage the underside of the handle 47, whereby the pressure from the spring forces the lower end of the socket against the catch prongs 43 and maintains the same in position thereagainst, as illustrated in Figure 1 of the drawings.

A downwardly depending forked projection 49 is formed on the underside of the cap 23 and extends below the plane of the sealing ring 37 and into engagement with the upper ends of the upstanding forked pressure plate projection 19. A graduated indicator tape 50 travels over two sheaves or point center bearings 51, mounted in the upper end of the indicator housing 12 on either side of pressure plate 17. One end of the tape 50 is connected to the upper end of a counter weight 52 disposed in the storage tank, and the other end is secured to the upper end of a float 53 in the tank. The underside of the walled plate opening 22 is provided with a packing ring or gasket 54 suitably positioned within a recess 55 therein, which is adapted to contact or press against a similar packing ring or gasket 56 positioned in a recess 57 in the pressure plate 17. Thus the indicator tape 50 is caused to pass between the packing rings 54 and 56 and through the forked projection 19 on the pressure plate and beneath a sight wire 58 extending across said forks 19 in order to permit the operator to take a reading on the tape when the lid is opened, as hereinafter described.

When it is desired to make a reading of the indicator tape, the handle 47 of latch pin 41 is pulled downwardly, as shown in dotted lines in Figure 1, whereby the socket 45 follows the curvature of the pronged catch ends 44 on the cover and slides out of engagement therewith. When the latch pin is freed from the catch the pressure due to gas in the indicator head and storage tank forces the cover open a slight distance and the pressure plate 17 and projection 19 thereon is caused to rise by reason of the tension spring 20 acting on the underside of the plate. The projection 19 pushes the downwardly extending cover projection 49 and cover upwardly until the packing rings 54 and 56 on the walled plate opening 22 and pressure plate 17, respectively, engage and tightly seal the opening 22 in the indicator housing. The cover or lid 23 is then manually lifted into open position, as shown in dotted lines in Figure 1. Any suitable means may then be used to wipe off or clean the tape to enable a reading to be taken, should the tape be dirty.

By virtue of the present structure, it is not necessary to position a sight glass over the gauge tape, as the cover and pressure plate assembly permit the tape to be clearly exposed to view when the cover is moved to open position, as previously described, and therefore an accurate reading is obtained without the accompanying escape or loss of a large amount of pressure from within the housing.

It will be noted that the socket springs 36 and 48 of the hinge pin sockets 31 and 45, respectively, force the sockets downwardly against the cover 23 which results in the sealing ring 37 being pressed against the gasket 39 thus effecting a tight seal for the cover opening which prevents any leakage of pressure within the gauge housing and tank. As the straight pin 27 of the cover hinge pin assembly 26 is positioned within elongated or slightly oblong pin openings 28 in the gauge housing lug 24, the hinge pin and socket are permitted a slight range of upward movement which is particularly desirable due to the fact that the sealing ring and gasket become worn from continued usage thus reducing the sealing action at that point, but in view of the automatic upward adjusting movement of the hinge assembly, compensation is made for the wear of the sealing ring and gasket. In other words, as the sealing ring or gasket wears away, the pin assembly adjusts itself permitting the same degree of pressure on the cover being maintained, which causes the sealing ring to be tightly sealed to compensate for the wear of these parts.

While I have described in detail apparatus embodying my invention it is to be understood that various modifications in the construction shown and described, may be made without departing from the scope of my invention.

What I claim is:

1. In combination with a liquid storage tank, an indicating casing on top of said tank, an indicating tape passing through said casing for indicating the liquid level in the tank, and said casing having an opening under which said tape passes, a movable cover closing said opening, means in said casing for normally sealing the opening and over which said tape passes whereby said tape is clamped and that portion of the tape below the opening is exposed, and means carried by the cover for releasing said sealing means when the cover is in position closing the opening.

2. In combination with a liquid storage tank, an indicating casing on top of the said tank and in communication therewith, a float operated indicating tape passing through said casing for indicating the liquid level in said tank, said casing having an opening under which said tape passes, a movable cover closing said opening, spring pressed means in said casing for normally sealing the lower end of said opening and over which said tape passes whereby said tape is clamped and that portion of the tape below the opening is exposed, and means carried by the cover for releasing said sealing means when the cover is in position closing the opening.

3. In combination with a liquid storage tank, an indicating casing on said tank and communicating therewith, a float operated indicating tape passing through said casing for indicating the liquid level in said tank, said casing having an opening under which said tape passes, a movable cover closing the upper end of the opening, a spring pressed disk over which the tape passes for closing and sealing the lower end of the opening below and around the tape and exposing the tape below the opening when the cover is removed and means operated by the cover when closed for releasing and holding the sealing means to allow of a free movement of the indicating tape.

4. In combination with a liquid storage tank, an indicating casing on said tank and communicating therewith, a float operated indicating tape passing through said casing for indicating the liquid level in said tank, said casing having an opening under which said tape passes, a movable cover closing the upper end of the opening, a gasket surrounding the lower end of the opening, a spring pressed disk over which said tape passes for normally clamping the tape against the gasket and sealing the lower end of the opening when the cover is removed and means operated by the cover when closed for releasing and holding the sealing means to allow of a free movement of the indicating tape.

5. In combination with a liquid storage tank, an indicating casing on said tank and communicating therewith, a float operated indicating tape passing through the casing for indicating the liquid level in the tank, said casing having an opening under which said tape passes whereby a portion of the indicating tape is exposed, a cover closing said opening, a plate member below said opening in said casing and over which said tape passes and having a downwardly depending stem thereon, collar means in said casing for slidably receiving said stem, a coil spring surrounding the collar and engaging the plate for moving the same upwardly into sealing engagement around the lower end of the opening and into clamping engagement with said tape, a downwardly depending stem on the cover adapted to engage said plate whereby said plate is held out of sealing engagement with said opening when the cover is closed.

6. In combination with a liquid storage tank, an indicating casing on said tank and communicating therewith, a float operated indicating tape passing through the casing for indicating the liquid level in the tank, said casing having an opening under which said tape passes whereby a portion of the indicating tape is exposed, a cover closing said opening, a plate member below said opening in said casing and under which said tape passes, spring means for normally holding said plate into sealing engagement around the lower end of said opening and in clamping engagement with said tape, and a downwardly depending stem on the cover adapted to engage said plate whereby said plate is held out of sealing engagement around said opening and out of engagement with said tape when the cover is closed.

CHARLES SPAETH.